United States Patent
Valent (12)

(10) Patent No.: US 6,175,472 B1
(45) Date of Patent: *Jan. 16, 2001

(54) METHOD FOR GENERATING A POSITION ERROR SIGNAL CALIBRATION CURVE IN A HARD DISK DRIVE

(75) Inventor: James A. Valent, Longmont, CO (US)

(73) Assignee: Maxtor Corporation, Longmont, CO (US)

(*) Notice: Under 35 U.S.C. 154(b), the term of this patent shall be extended for 0 days.

This patent is subject to a terminal disclaimer.

(21) Appl. No.: 09/232,331

(22) Filed: Jan. 15, 1999

Related U.S. Application Data

(63) Continuation of application No. 08/706,441, filed on Aug. 30, 1996, now Pat. No. 5,867,353, which is a continuation of application No. 08/315,877, filed on Sep. 30, 1994, now abandoned.

(51) Int. Cl.[7] .................. G11B 5/82; G11B 5/596
(52) U.S. Cl. ........................... 360/135; 360/77.08
(58) Field of Search ............. 360/77.01, 77.02, 360/77.04, 77.05, 77.07, 77.08, 77.11, 77.14, 131, 135

(56) References Cited

U.S. PATENT DOCUMENTS

| | | | |
|---|---|---|---|
| 5,121,260 | 6/1992 | Asakawa et al. | 36/31 |
| 5,400,201 | 3/1995 | Pederson | 360/135 |
| 5,436,773 | 7/1995 | Hanson | 360/77.08 |
| 5,455,724 | 10/1995 | Suzuki et al. | 360/77.04 |
| 5,760,990 | 6/1998 | Uktani et al. | 360/77.04 |
| 5,940,240 | 6/1998 | Kupferman | 360/77.08 |

FOREIGN PATENT DOCUMENTS

| | | |
|---|---|---|
| 267669 | 5/1988 | (EP). |
| 361222 | 4/1990 | (EP). |
| WO 88/03693 | 5/1988 | (WO). |
| WO 93/10525 | 5/1993 | (WO). |

OTHER PUBLICATIONS

G.S. Mowry, P.K. George, K.M. Loeffler and N.R. Belk, "Thin–Film Magnetorresistive Heads for Narrow–Track Winchester Applications (Invited)", IEEE Transactions on Magnetics, vol. MAG–22, No. 5, Sep. 1986, pp. 671–676.

*Magnetic Recording*, vol. I, Mee, Daniel, McGraw–Hill Press, '87, Section 4.4.3, pp. 289–295.

H. Suyama, K. Tsunewaki, M. Fukuyama, N. Saito, T. Yamada and H. Karamon, "Thin Film MR Head for High Density Rigid Disk Drive", IEEE Transactions on Magnetics, vol. 24, No. 6, Nov. 1988, pp. 2612–2614.

P.I. Bonyhard, "Design Issues for Practical Rigid Disk Magnetoresistive Heads", IEEE Transactions on Magnetics, vol. 26, No. 6, Nov. 1990, pp. 3001–3003.

Ching Tsang, Mao–Min Chen, Tadashi Yogi, Kochan Ju, "Gigabit Density Recording Using Dual–Element MR/Inductive Heads On Thin–Film Disks", IEEE Transactions on Magnetics, vol. 26, No. 5, Sep. 1990, pp. 1689–1693.

F.B. Shelledy and J.L. Nix, "Magnetoresistive Heads for Magnetic Tape and Disk Recording", IEEE Transactions on Magnetics, vol. 28, No. 5, Sep. 1992, pp. 2283–2288.

Primary Examiner—George J. Letscher
(74) Attorney, Agent, or Firm—David M. Sigmond

(57) ABSTRACT

A method and apparatus for generating a position error signal (PES) voltage v. track distance curve for the head of a hard disk drive. The disk has a dedicated track which contains a plurality of servo bits that allow the head to be centered with the centerline of the track. The dedicated track also has a number of calibration bits each embedded at a known location off-set from the track centerline. The PES voltage v. track distance curve is generated by reading each calibration bit and storing the corresponding amplitude of the position error signal in a memory device of the disk drive. Each calibration bit is located from the track centerline a distance that is different from the other calibration bits so that there are provided multiple points on the track curve.

29 Claims, 3 Drawing Sheets

METHOD FOR GENERATING A POSITION ERROR SIGNAL CALIBRATION CURVE IN A HARD DISK DRIVE

CROSS-REFERENCE TO RELATED APPLICATIONS

This application is a continuation of U.S. application Ser. No. 08/706,441 filed Aug. 30, 1996 (U.S. Pat. No. 5,867,353), which is a continuation of U.S. application Ser. No. 08/315,877 filed Sep. 30, 1994 (abandoned).

BACKGROUND OF THE INVENTION

1. Field of the Invention

The present invention relates to a method for generating a position error signal calibration curve for a read element of a hard disk drive.

2. Description of Related Art

Hard disk drives contain a disk that rotates relative to a head. The head is located at the end of an actuator arm assembly. The actuator arm assembly includes a voice coil motor which can move the head relative to the surface of the disk. The head contains a transducer which can magnetize and sense the magnetic field of the disk.

Data is stored on the disk within a number of concentric radial tracks. Each track is further divided into a plurality of sectors. To accurately write and read data, it is desirable to maintain the head on the center of the track. To assist in controlling the position of the head, each sector of the disk typically contains a number of servo bits accurately located relative to the centerline of the track. The raw signals produced by the servo bits are typically demodulated into a single position error signal (PES). The electronic circuits of the drive utilize the position error signals to determine the position of the head relative to the track, and to move the actuator arm if the head is not located on the track centerline.

The servo routine of a hard disk drive is typically performed with a position error signal voltage v. track distance curve that is stored within memory of the drive. The voltage v. track distance curve provides a correlation between the amplitude of the position error signal and the distance between the head and the center of the track. For example, a PES signal having an amplitude of approximately ½ of the peak amplitude may provide an indication that the head is a ¼ track width away from the track centerline. In accordance with the track curve, the actuator arm is moved a corresponding distance to center the head. The voltage v. track distance curve is typically based on an ideal curve that is generated from an algorithm stored in the read only memory (ROM) of the drive.

Conventional hard disk drive read/write heads typically have a single transducer that both read and write data onto the disk. Generally speaking, conventional single element heads have reached maximum aerial densities (typically measured in gigabits per square inch). There does exist a dual element head that has been found to provide greater aerial densities than single element transducers. Dual element heads contain a single write element and a separate read element that is constructed from a magneto-resistive material. Such dual element transducers are commonly referred to as magneto-resistive (MR) heads.

Because of manufacturing tolerances, the separate magneto-resistive element may be off-center from the write element of the head. Therefore, if data is written off the center of the track, to read the data, the servo system must move the head slightly off-center so that the read element is centered with the written data. The routine of moving an MR head during a read operation is commonly referred to as micro-jogging.

The head can be moved in accordance with the voltage v. track distance curve stored in memory. It has been found that the voltage v. track distance curve for a MR head is nonlinear in nature and varies greatly between different heads. It would therefore be desirable to provide a method for Generating an actual voltage v. track distance for a magneto-resistive head.

SUMMARY OF THE INVENTION

The present invention is a method and apparatus for generating a position error signal (PES) voltage v. track distance curve for the head of a hard disk drive. The disk has a dedicated track which contains a plurality of servo bits that allow the head to be centered with the centerline of the track. The dedicated track also has a number of calibration bits each embedded at a known location off-set from the track centerline. The PES voltage v. track distance curve is generated by reading each calibration bit and storing the corresponding amplitude of the position error signal in a memory device of the disk drive. Each calibration bit is located from the track centerline a distance that is different from the other calibration bits so that there are provided multiple points on the track curve.

BRIEF DESCRIPTION OF THE DRAWINGS

The objects and advantages of the present invention will become more readily apparent to those ordinarily skilled in the art after reviewing the following detailed description and accompanying drawings, wherein.

DETAILED DESCRIPTION OF THE INVENTION

Figure 1:
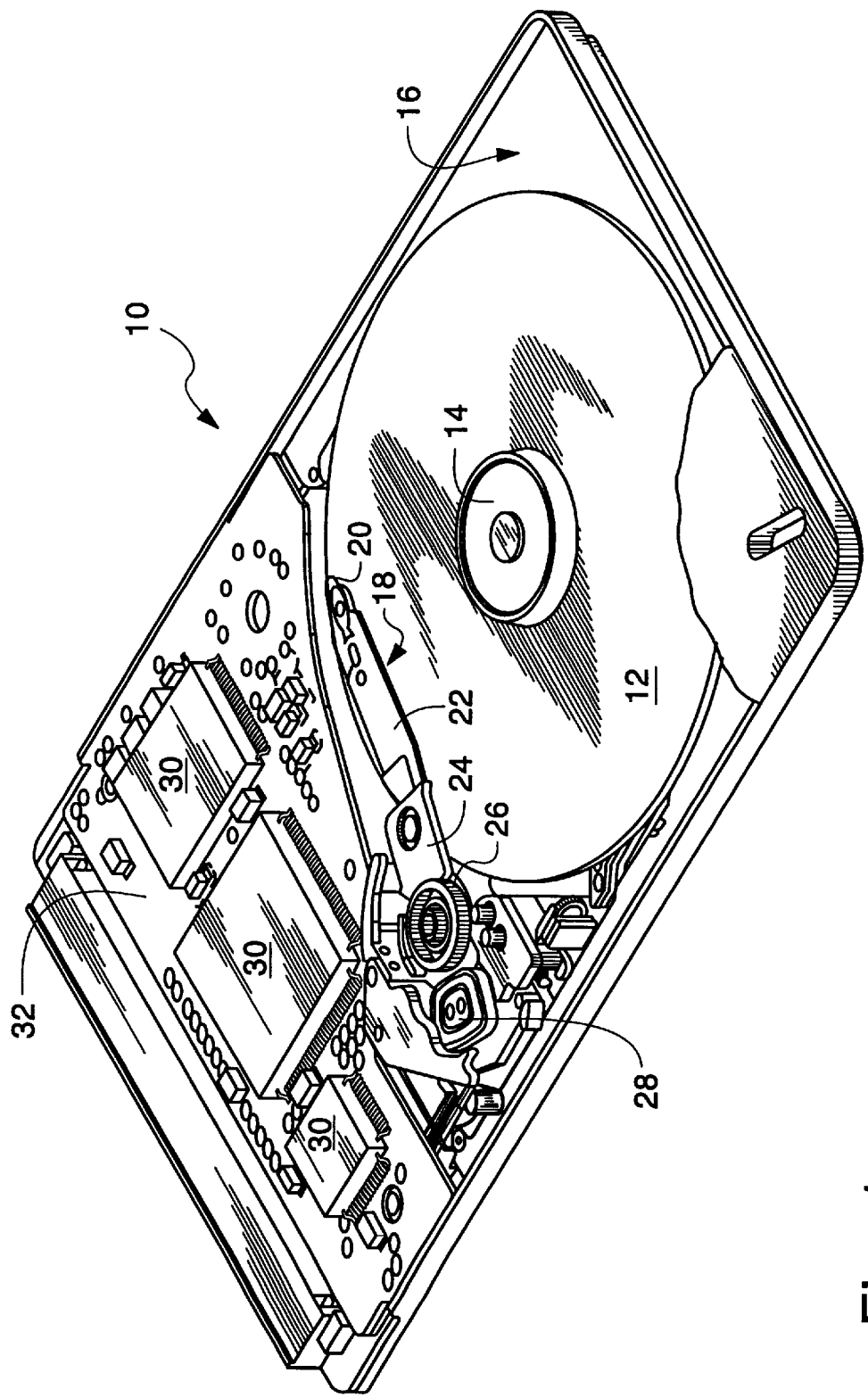
FIG. 1 is a top view of a hard disk drive.

Referring to the drawings more particularly by reference numbers, FIG. 1 shows a hard disk drive 10. The disk drive 10 includes a disk 12 that is rotated by a spin motor 14. The spin motor 14 is mounted to a base plate 16. Also mounted to the base plate 16 is an actuator arm assembly 18. The actuator arm assembly 18 includes a number of heads 20 mounted to corresponding flexure arms 22. The flexure arms 22 are attached to an actuator arm 24 that can rotate about a bearing assembly 26. The actuator arm assembly 18 also contains a voice coil motor 28 which moves the heads 20 relative to the disk 12. There is typically a single head for each disk surface. The spin motor 14, voice coil motor 28 and the heads 20 are coupled to a number of electronic circuits 30 mounted to a printed circuit board 32. The electronic circuits 30 typically include a read channel chip, a microprocessor based controller and random access memory (RAM) device.

Figure 2:
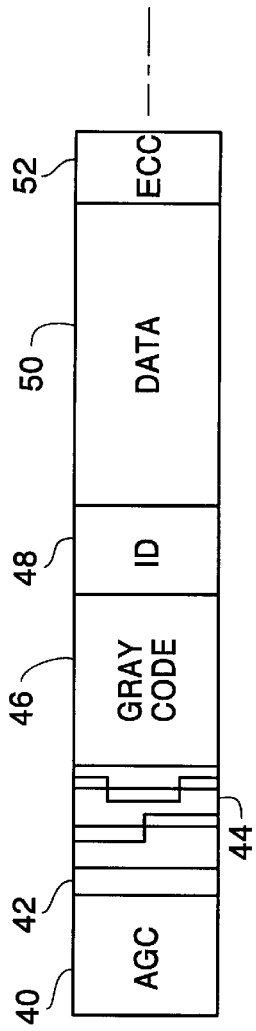
FIG. 2 is a schematic of a conventional data sector of the disk.

As shown in FIG. 2, data is typically stored within sectors of radially concentric tracks located across the disk 12. A typical sector will have an automatic gain control (AGC) field 40, a synchronization (sync) pulse 42, a number of servo bits 44, a gray code field 46 that identifies the track, an identification (ID) field 48 that defines the sector, a data field 50 which contains the data and an error correction code field 52. The electronic circuits 30 utilize the servo bits 44 to maintain the heads 20 on the centerline CL of the track. If the heads 20 are off-center the electronic circuits 30 will generate a position error signal (PES) which has a voltage amplitude that varies with the distance that the heads 20 are off-set from the track centerline.

The heads 20 can magnetize and sense the magnetic field of the disk. In the preferred embodiment, each head 20 has a single write element and a separate read element. The read element is preferably constructed from a magneto-resistive material which changes resistance in proportion to the intensity of an external magnetic field.

Figure 3:
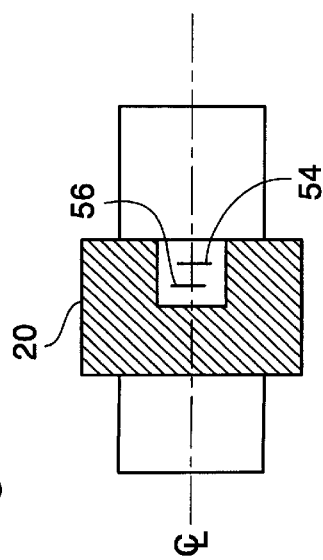
FIG. 3 is a schematic showing a head reading data from a data sector.

As shown in FIG. 3, the read element 44 is sometimes off-set from the write element 56 because of the tolerances associated with the manufacturing process of the head. Because the write element 56 is off-set from the read element 54, the data is written off-center from the center of the track. To properly read the data, the read element 54 must be moved over to the off-center location of the written data.

Figure 4:
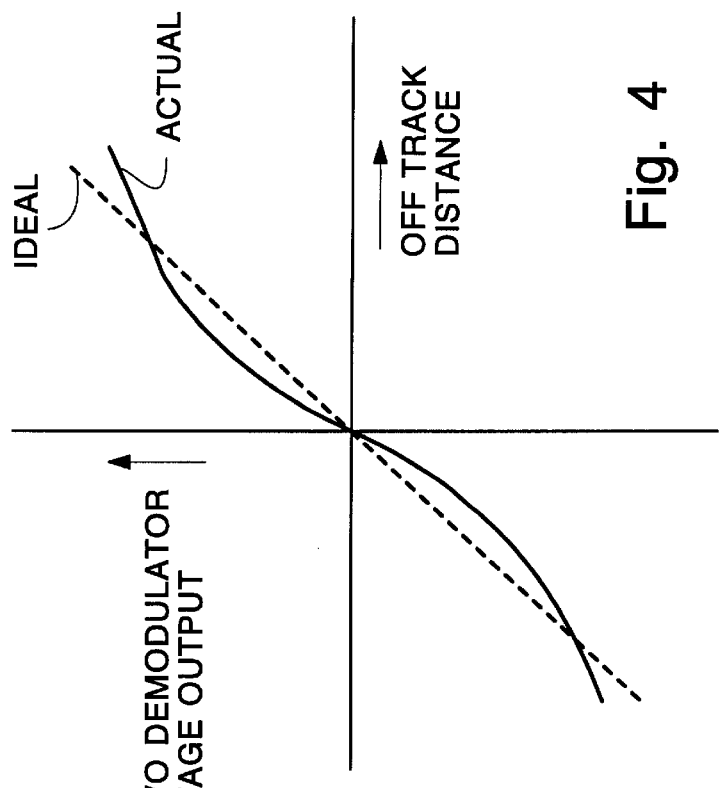
FIG. 4 is a graph showing a PES voltage v. track distance curve.

The heads 20 are moved in accordance with the position error signal voltage v. track distance curve shown in FIG. 4. The off-set distance between the write element 56 and the element 54 for each head is typically calculated when the disk is initially assembled. When both elements are concentric the PES signal should be ideally zero when the read track is centered with the written data. If the read element 54 is off-set from the write element 56 the PES signal is some non-zero value when the read element is centered over the written data. The microprocessor based controller utilizes the curve to determine the position of the heads 20 and the movement required to center the read element 46 with the written data. It has been found that the PES voltage v. track distance curve is typically non-linear for magneto-resistive heads.

Figure 5:
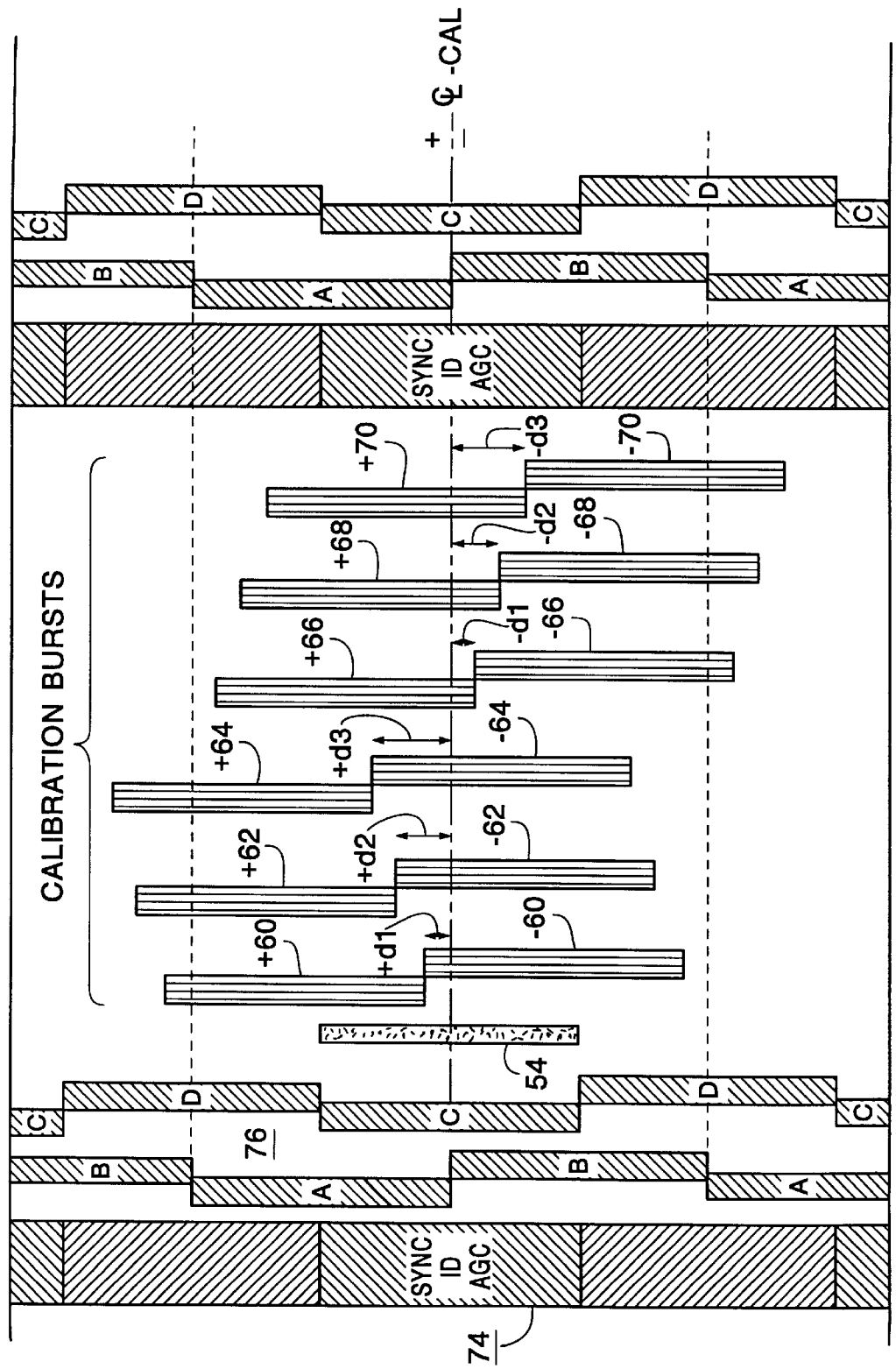
FIG. 5 is a schematic of a dedicated track that contains a number of calibration bits.

FIG. 5 shows a plurality of calibration bits 60–70 that are embedded into the disk 12 and used to create the curve depicted in FIG. 4. The calibration bits 60–70 are typically located in a dedicated calibration track of the disk which has no data. The calibration track has an SYNC/ID/AGC field 74 to provide corresponding functions for the operation of finding, tracking and reading the dedicated track. Although the SYNC, ID and AGC are shown as one field, it is to be understood that these functions can be located within separate fields. It should also be under stood that these field are standard servo fields used in the servo sectors of data carrying tracks of sectored servo disk drives.

The calibration track also contains a number of servo bits 76 designated A, B, C and D. The boundary formed by the A and B servo bits defines the track centerline CL of the servo calibration track. The boundary formed by the C and D servo bits is offset by a distance corresponding to ½ of the track width. The C and D servo bits are not used in the servo signal calibration. The servo bits are detected by the read element 54 of the head and demodulated by the electronics into a single PES signal. The servo bits A and B are used to center the read element 54 with the centerline CL of the dedicated track.

The calibration bits 60–70 each have a centerline located at a predetermined off-set position from the track centerline CL. The calibration bits are typically embedded with the servo bits during the assembly process of the disk drive with instrumentation that accurately controls the location of the bits. The boundary of the first set of calibration bits +60 and −60 defines a centerline that is located at a predetermined distance +d1 from the track centerline CL. The calibrations bit sets +/−62 and +/−64 define servo bit centerlines that are located distances of +d2 and +d3 from the track centerline, respectively. Likewise the calibration bit sets +/−56–60 define servo bit centerlines offset by distances −d4, −d5, and −d6 with respect to the track centerline CL, respectively.

When the read element 54 passes over a set of calibration bits, the electronic circuits 30 will generate a demodulated PES signal which has an amplitude that correlates to the location of the pair of calibration bits relative to the centerline of the track. The PES signal will have a larger voltage amplitude for calibration bits that are located farther away from the track centerline.

In operation, the heads are moved to the dedicated calibration track and centered on the track centerline CL using the servo bits A and B. The read element 54 then reads the calibration bits 60–70. Corresponding demodulated PES signals are then generated from the calibration bits and stored in a memory device of the disk drive. The various calibration points are interpolated to create the PES voltage v. track distance curve shown in FIG. 4. Although 6 sets of calibration bits are shown and described, it is to be understood that any number of bits can be used to generate enough data points to create a PES voltage v. track distance curve. The disk drive typically goes through the routine of generating the curve after each "power-on" sequence of the drive. Alternatively, the curve can be generated when the disk drive is initially assembled and then stored in a nonvolatile memory medium such as the disk 12.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A method for generating a position error signal calibration curve for a hard disk drive, comprising the steps of:
    (a) providing a disk surface with a calibration track and user data tracks, wherein the calibration track includes sets of calibration bits and the user data tracks include data fields for storing user data, and each set of calibration bits includes a calibration bit that is spaced from a centerline of the calibration track;
    (b) aligning a read element over the centerline of the calibration track;
    (c) sensing the calibration bits;
    (d) generating a position error signal for each set of the calibration bits; and
    (e) generating the position error calibration curve using the position error signals.

2. The method as recited in claim 1, wherein the calibration curve provides a position error signal voltage versus track distance curve for a head that includes the read element.

3. The method as recited in claim 2, wherein the head includes a write element that is separate from the read element, and the calibration curve compensates for a lateral offset between the read and write elements.

4. The method as recited in claim 1, wherein sensing the calibration bits is performed during a single rotation of the disk surface.

5. The method as recited in claim 1, wherein each of the position error signals has a different voltage amplitude.

6. The method as recited in claim 1, wherein the calibration track is devoid of the data fields.

7. The method as recited in claim 6, wherein the user data tracks are devoid of the calibration bits.

8. The method as recited in claim 1, wherein the sets of calibration bits include a first set of calibration bits that define a first common boundary offset from the centerline of the calibration track, and a second set of calibration bits that define a second common boundary offset a greater distance than the first common boundary from the centerline of the calibration track.

9. The method as recited in claim 8, wherein the first and second common boundaries are between the centerline of the calibration track and the centerline of a first one of the user data tracks that is adjacent to the calibration track, and the first and second common boundaries are closer to the centerline of the calibration track than the centerline of the first one of the user data tracks.

10. The method as recited in claim 9, wherein the sets of calibration bits include a third set of calibration bits that define a third common boundary offset from the centerline of the calibration track, and a fourth set of calibration bits that define a fourth common boundary offset a greater distance than the third common boundary from the centerline of the calibration track, and wherein the first and second common boundaries are on a first side of the centerline of the calibration track and the third and fourth common boundaries are on a second side opposite the first side of the centerline of the calibration track.

11. The method as recited in claim 10, wherein the third and fourth common boundaries are between the centerline of the calibration track and the centerline of a second one of the user data tracks that is adjacent to the calibration track on the second side of the centerline of the calibration track, and the third and fourth common boundaries are closer to the centerline of the calibration track than the centerline of the second one of the user data tracks.

12. The method as recited in claim 11, wherein first, second, third and fourth sets of calibration bits each consist of a bit pair in which one bit intersects the centerline of the calibration track and another bit is spaced from the centerline of the calibration track.

13. The method as recited in claim 1, wherein steps (a) through (c) are performed in the sequence set forth.

14. The method as recited in claim 1, wherein steps (a) through (e) are performed and the calibration curve is stored in the hard disk drive after each power-on sequence of the hard disk drive.

15. The method as recited in claim 1, wherein steps (a) through (e) arc performed and the calibration curve is stored in the hard disk drive when the hard disk drive is initially assembled.

16. A method for generating a position error signal voltage versus track distance calibration curve for a read element in a head in a hard disk drive, comprising the following steps:
(a) providing a disk surface a plurality of concentric tracks that include a calibration track and user data tracks, wherein the calibration track includes servo bits and calibration bits and is devoid of data fields for storing user data, the user data tracks include data fields for storing user data, the servo bits define a servo common boundary that is aligned with a centerline of the calibration track, the calibration bits include a first set of calibration bits that define a first common boundary parallel to and offset a first distance from the centerline of the calibration track and a second set of calibration bits that define a second common boundary parallel to and offset a second distance from the centerline of the calibration track, the first and second sets of calibration bits each include a calibration bit that is spaced from the centerline of the calibration track, and the second distance is greater than the first distance;
(b) sensing the servo bits using the read element to align the read element over the centerline of the calibration track;
(c) sensing the calibration bits using the read element after aligning the read element over the centerline of the calibration track;
(d) generating a position error signal for each set of the calibration bits, wherein each of the position error signals has a different voltage amplitude; and
(e) generating the calibration curve using the voltage amplitudes of the position error signals.

17. The method as recited in claim 16, wherein the head includes a write element that is separate from the read element, and the calibration curve compensates for a lateral offset between the read and write elements.

18. The method as recited in claim 16, wherein sensing the calibration bits is performed during a single rotation of the disk surface.

19. The method as recited in claim 16, wherein the first and second common boundaries are between the centerline of the calibration track and the centerline of one of the user data tracks that is adjacent to the calibration track, and second common boundary is offset from the centerline of the one of the user data tracks by substantially the second distance.

20. The method as recited in claim 16, wherein the first and second sets of calibration bits each consist of a bit pair in which one bit intersects the centerline of the calibration track and another bit is spaced from the centerline of the calibration track.

21. A method for generating a position error signal calibration curve in order to compensate for transducer positioning errors caused by a lateral offset between a read element and a write element on a transducer in a hard disk drive, comprising the steps of:
(a) providing a disk surface with a calibration track and user data tracks, wherein the calibration track includes sets of calibration bits and the user data tracks include data fields for storing user data, and each set of calibration bits includes a calibration bit that is spaced from a centerline of the calibration track;
(b) aligning the read element over the centerline of the calibration track;
(c) sensing the calibration bits using the read element after step (b);
(d) generating a position error signal for each set of the calibration bits, wherein each of the position error signals has a different voltage amplitude; and
(e) generating the position error calibration curve using the voltage amplitudes of the position error signals.

22. The method as recited in claim 21, wherein the calibration curve provides a position error signal voltage versus track distance curve for the read element.

23. The method as recited in claim 21, wherein the calibration track is devoid of the data fields and the user data tracks are devoid of the calibration bits.

24. The method as recited in claim 21, wherein the sets of calibration bits include a first set of calibration bits that define a first common boundary parallel to and offset a first distance from the centerline of the calibration track, a second set of calibration bits that define a second common boundary parallel to and offset a second distance from the centerline of the calibration track, a third set of calibration bits that define a third common boundary parallel to and offset a third distance from the centerline of the calibration track, and a fourth set of calibration bits that define a fourth common boundary parallel to and offset a fourth distance from the centerline of the calibration track, and wherein the first distance is less than the second distance, the third distance is less than the fourth distance, the first and second boundaries are between the centerlines of the calibration track and a first one of the user data tracks adjacent to a first side of the calibration track, and the third and fourth boundaries are between the centerlines of the calibration track and a second one of the user data tracks adjacent to a second side of the calibration track.

25. The method as recited in claim 24, wherein the first and second common boundaries are closer to the centerline of the calibration track than the centerline of the first one of the adjacent user data tracks, and the third and fourth common boundaries are closer to the centerline of the calibration track than the centerline of the second one of the adjacent user data tracks.

26. The method as recited in claim 24, wherein first, second, third and fourth sets of calibration bits each consist of one bit that intersects the centerline of the calibration track and another bit that is spaced from the centerline of the calibration track.

27. The method as recited in claim 21, wherein the hard disk drive is an embedded servo system.

28. The method as recited in claim 21, wherein steps (a) through (e) are performed and the calibration curve is stored in the hard disk drive after each power-on sequence of the hard disk drive.

29. The method as recited in claim 21, wherein steps (a) through (e) are performed and the calibration curve is stored in the hard disk drive when the hard disk drive is initially assembled.

* * * * *